(12) United States Patent
Hong et al.

(10) Patent No.: US 10,157,239 B2
(45) Date of Patent: Dec. 18, 2018

(54) FINDING COMMON NEIGHBORS BETWEEN TWO NODES IN A GRAPH

(71) Applicant: Oracle International Corporation, Redwood Shores, CA (US)

(72) Inventors: Sungpack Hong, Palo Alto, CA (US); Martin Sevenich, Palo Alto, CA (US); Hassan Chafi, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 398 days.

(21) Appl. No.: 14/139,237

(22) Filed: Dec. 23, 2013

(65) Prior Publication Data
US 2015/0178405 A1    Jun. 25, 2015

(51) Int. Cl.
*G06F 17/30* (2006.01)
(52) U.S. Cl.
CPC .............................. *G06F 17/30958* (2013.01)
(58) Field of Classification Search
None
See application file for complete search history.

(56) References Cited

U.S. PATENT DOCUMENTS

| | | | |
|---|---|---|---|
| 6,233,575 B1 | 5/2001 | Agrawal et al. | |
| 8,059,602 B2 | 11/2011 | Kim | |
| 8,606,774 B1 * | 12/2013 | Makadia | G06F 17/30 345/653 |
| 8,606,787 B1 * | 12/2013 | Asgekar | G06Q 50/01 707/737 |
| 8,909,646 B1 * | 12/2014 | Fabrikant | G06F 17/30598 707/737 |
| 9,236,885 B2 * | 1/2016 | Shokrollahi | H03M 13/1102 |
| 2002/0075263 A1 | 6/2002 | Kato | |
| 2002/0193981 A1 * | 12/2002 | Keung | G06K 9/6219 704/1 |

(Continued)

OTHER PUBLICATIONS

Wang et al., "On Triangulation-based Dense Neighborhood Graphs Discovery", The 37th International Conference on Very Large Data Bases, Aug. 28 Sep. 3, 2011, Seattle, Washington, Copyright 2010, 12 pages.

(Continued)

*Primary Examiner* — Christopher J Raab
(74) *Attorney, Agent, or Firm* — Hickman Palermo Becker Bingham LLP; Daniel D. Ledesma

(57) ABSTRACT

Techniques for identifying common neighbors of two nodes in a graph are provided. One technique involves performing a binary split search and/or a linear search. Another technique involves creating a segmenting index for a first neighbor list. A second neighbor list is scanned and, for each node indicated in the second neighbor list, the segmenting index is used to determine whether the node is also indicated in the first neighbor list. Techniques are also provided for counting the number of triangles. One technique involves pruning nodes from neighbor lists based on the node values of the nodes whose neighbor lists are being pruned. Another technique involves sorting the nodes in a node array (and, thus, their respective neighbor lists) based on the nodes' respective degrees prior to identifying common neighbors. In this way, when pruning the neighbor lists, the neighbor lists of the highly connected nodes are significantly reduced.

22 Claims, 12 Drawing Sheets

(56) References Cited

U.S. PATENT DOCUMENTS

| | | | |
|---|---|---|---|
| 2005/0028148 A1* | 2/2005 | Civlin | G06F 9/45516 |
| | | | 717/145 |
| 2005/0055334 A1 | 3/2005 | Krishnamurthy | |
| 2005/0268171 A1 | 12/2005 | House et al. | |
| 2007/0192451 A1* | 8/2007 | Tran | H04L 12/1836 |
| | | | 709/223 |
| 2008/0256057 A1* | 10/2008 | Riise | G06F 17/273 |
| 2010/0082545 A1* | 4/2010 | Bhattacharjee | H03M 7/30 |
| | | | 707/641 |
| 2011/0016460 A1* | 1/2011 | Archambault | G06F 8/4442 |
| | | | 717/158 |
| 2012/0221604 A1 | 8/2012 | Gao | |
| 2012/0259915 A1* | 10/2012 | Bhatt | G06Q 50/01 |
| | | | 709/204 |
| 2012/0317149 A1* | 12/2012 | Jagota | G06F 17/30958 |
| | | | 707/798 |
| 2014/0095519 A1 | 4/2014 | Liu | |
| 2014/0214936 A1* | 7/2014 | Abraham | H04W 4/206 |
| | | | 709/204 |
| 2014/0229510 A1* | 8/2014 | Yu | G06F 17/30958 |
| | | | 707/798 |
| 2014/0282455 A1* | 9/2014 | Felch | G06F 8/4441 |
| | | | 717/158 |
| 2015/0134670 A1 | 5/2015 | Liu et al. | |
| 2015/0146655 A1 | 5/2015 | Hui | |
| 2015/0178406 A1 | 6/2015 | Hong et al. | |

OTHER PUBLICATIONS

Pavan et al., "Counting and Sampling Triangles from a Graph Stream", dated Dec. 12, 2012, IBM Research Report, 18 pages.

Chu et al., "Triangle Listing in Massive Networks", dated Aug. 24, 2011, 33 pages.

Nicolac et al., "Efficient Sequential and Parallel Algorithms for Planted Motif Search", dated Jul. 2, 2013, 13 pages.

Tsourakakis et al., "Approximate Triangle Counting", dated Jun. 30, 2009, 16 pages.

Cui et al., "Link Prediction on Evolving Data Using Tensor-based Common Neighbor", IEEE, 2012, 4 pages.

Avron et al., "Counting Triangles in Large Graphs Using Randomized Matrix Trace Estimation" dated Jul. 25, 2010, 10 pages.

Becchetti et al., "Efficient Semi-Streaming Algorithms for Local Triangle Counting in Massive Graphs", dated Aug. 24-27, 2008, 9 pages.

Tsourakakis et al., "Fast Counting of Triangles in Large Networks: Algorithm's and Laws", Data Mining, 2008. ICDM '08. Eighth IEEE International Conference on Dec. 15-19, 2008, 10 pages.

Kolountzakis et al., "Efficient Triangle Counting in Large Graphs via Degree-Base Vertex Partitioning", dated 2010, 17 pages.

A. Brabasi and R. Albert, "Emergence of Scaling in Random Networks", Science, dated 1999, 4 pages.

Charalampos E. Tsourakakis, U Kang, Gary L. Miller,and Christos Faloutsos. Doulion: "Counting triangles in massive graphs with a coin". In Knowledge Discovery and Data Mining (KDD), 2009, 9 pages.

Wikipedia, "Scale-Free Network", last accessed on Nov. 4, 2014, 8 pages.

Jung—"Java Universal Network/Graph Framework", last accessed on Nov. 4, 2014, http://jung.sourceforge.net/, 3 pages.

Leskovec, Jure, "SNAP: Stanford Network Analysis Project", http://snap.stanford.edu/, last accessed on Nov. 4, 2014, 2 pages.

H. Kwak, C. Lee, H. Park, and S. Moon. "What is Twitter, a social network or a news media", Proceedings of the 19th international conference on World Wide Web, 2010 (WWW'2010), 10 pages.

S. Suri, S. Vassilivitskii. "Counting Triangles and the Curse of the Last Reducer", Proceedings of the $20^{th}$ international conference on World Wide Web, 2011 (WWW'2011), 8 pages.

Ziv Bar-Yossef et al., "Reduciton in Streaming Algorithms with an Application to Counting Triangles in Graphs", Proceedings SODA, dated 2002 ACM, pp. 623-632.

Seshadhri et al., Fast Triangle Counting through Wedge Sampling, Proceedings of the SIAM Conference on Data Mining. vol. 4, dated 2013, 9 pages.

Hossein et al., "New Streaming Algorithms for Counting Trangles in Graphs", Computing and Combinatorics, vol. 3595 of the series Lecture Notes in Computer Sciences dated 2005, pp. 710-716.

Buriol et al., "Counting Triangles in Data Streams", ACM, dated 2006, pp. 253-262.

U.S. Appl. No. 14/139,269, filed Dec. 23, 2013, Office Action, dated Oct. 15, 2015.

U.S. Appl. No. 14/498,893, filed Sep. 26, 2014, Office Action, dated Aug. 12, 2016.

* cited by examiner

FINDING COMMON NEIGHBORS BETWEEN TWO NODES IN A GRAPH

RELATED CASE

This case is related to U.S. application Ser. No. 14/139,269, filed Dec. 23, 2013 entitled "COUNTING TRIANGLES IN A GRAPH" and is incorporated herein by reference as if fully disclosed herein.

FIELD OF THE DISCLOSURE

The present disclosure relates to identifying common neighbors between two nodes and counting triangles in a graph.

BACKGROUND

Counting triangles in a graph has increasingly become an important task that is used in many domains. A single triangle in a graph indicates that three nodes in the graph are related to each other. For example, A is connected to B and C and B is also connected to C.

Knowing the number of triangles in a graph by itself is useful in some applications. However, an accurate understanding of the number of triangles in a graph serves as a building block for other graph analysis or graph mining tasks. For example, given the number of triangles in a graph, one can discover the clustering coefficient of a graph, which coefficient is a measure of the "community-ness" of the graph. The clustering coefficient is calculated by dividing the number of closed triangles by the sum of the number of closed triangles and the number of open triangles. A "closed triangle" is one where all three nodes are related to each other (e.g., A is connected to B and C and B and C are also connected to each other) while an "open triangle" is one where two nodes are connected to another node but not to each other (e.g., A is connected to B and C, but B and C are not connected to each other).

However, the actual computation time for counting (or estimating) the number of triangles in a graph is very large when implemented in conventional systems. For example, one implementation involves over 1,000 instances of Hadoop nodes and requires more than six hours to computer the number of triangles in a particular Twitter graph. Such hardware requirements and latency is unacceptable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
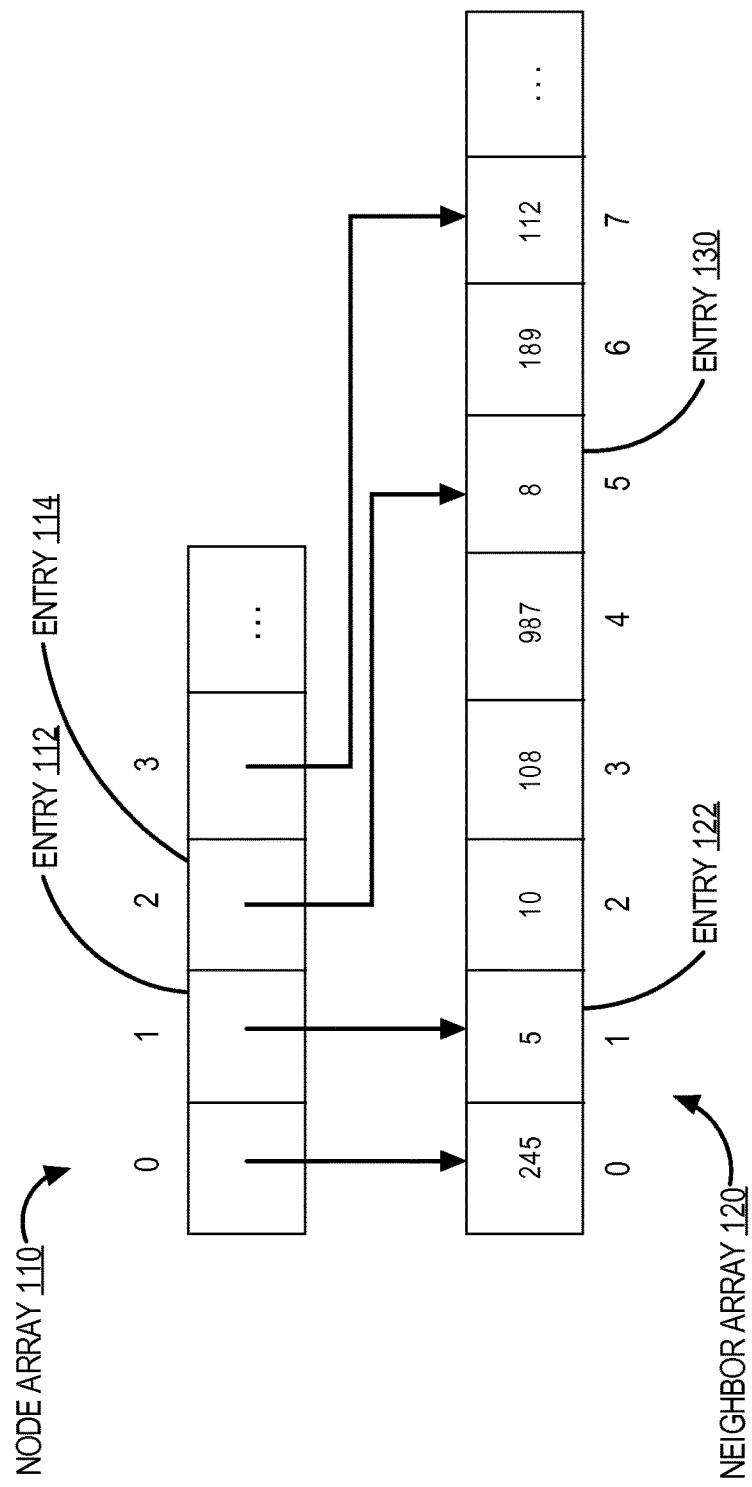
FIG. 1 is a block diagram that depicts two arrays for representing a graph, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are provided for identifying common neighbors between two nodes in a graph of nodes. In one technique, a binary splitting process is followed given two neighbor lists. A binary splitting process involves identify a neighbor in a first neighbor list, performing a (e.g., binary) search for the neighbor in a second neighbor list, and then splitting both neighbor lists and performing the process again, but on smaller neighbor lists. In another technique, a segmenting index is created for a first neighbor list. Then, for each neighbor in the second neighbor list, the segmenting index is used to determine whether the neighbor is also found in the first neighbor list.

Techniques are also provided for counting triangles in a graph. In one technique, before any common neighbors are identified, the neighbor lists of each node in the graph are pruned to remove neighbors whose values are less than the value of the corresponding node. In a related technique, the neighbor lists are first ordered based on degree such that the larger neighbor lists are organized separately from the shorter neighbor lists. Then the neighbor lists are pruned to remove neighbors whose values are less than the value of the corresponding node. In this way, the larger neighbor lists are reduced in size considerably. In one technique, code that, when executed, implements a triangle counting technique, is first analyzed by a compiler to determine whether a portion of the code matches a certain pattern and, if so, is modified to remove a neighborhood checking predicate. The neighborhood check is instead "pushed into" (or implemented in) a common neighbor identification function (or code) that is inserted into the analyzed code.

As noted previously, knowing a number of triangles in a graph has numerous applications. In addition to calculating a clustering coefficient, other graph metrics that require knowing the number of triangles include a transitivity ratio and a local clustering coefficient.

Example applications once a number of triangles is determined (or approximated) include thematic structure analysis, spamming activity analysis, and information brokerage identification.

Graph

Nodes in a graph may represent one of many different types of objects while edges that connect two nodes in the graph may represent one of many different types of relationships between the objects. Embodiments are not limited to any particular type of object or type of relationship.

For example, nodes in a graph may represent user accounts maintained by a social network that is provided by a social network provider, such as Facebook, Google+, LinkedIn, and Twitter. An edge in such a graph may represent that the two connecting nodes have established a relationship with each other or that one of the connecting nodes has decided to "follow" the other node (as in Twitter).

As another example, nodes in a graph may represent a network, such as the Internet, and edges in the graph may represent that computing devices are physically coupled to each other.

When a graph is stored in memory (whether volatile or non-volatile or both), the names of each node may be converted to a different value. For example, if a node represents a user account (e.g., "johnsmith1986") maintained by a social network provider, then the user identifier that identifies that user account for the social network provider may be mapped to another value, such as 2032, indicating that the user account is at least one of 2032 (or 2033) user accounts in the graph. Thus, while a process that implements techniques described herein for counting common neighbors or counting triangles may operate on integer values, such values may be later mapped back to the original value that identifies a real-world object, such as an email address, IP address, MAC address, or social network account identifier.

System Overview

Embodiments described herein may be implemented on a single computing device or multiple computing devices. For example, a single computing device may have enough memory to store graph data that indicates multiple nodes and their respective edges and to perform determinations, such as, given two sets of edges, determining which nodes are found in both sets.

As another example, multiple computing devices may be networked to allow different computing devices to analyze different portions of a graph. For example, computing device A analyzes the edges (or neighbors) of nodes 1-100 while computing device B analyzes the edges (or neighbors) of nodes 101-200.

Graph Representation

A graph may be represented in any number of ways. Embodiments are not limited to any particular representation. FIG. 1 is a block diagram that depicts two arrays: a node array 110 and a neighbor array 120, in an embodiment. Each entry in node array 110 corresponds to a different node in a graph and includes a value (e.g., an index, a reference, or a pointer) that is used to identify an entry in neighbor array 120. For example, if a user of a social networking service has 1029 friends (or registered contacts) and a node in node array 110 corresponds to that user, then neighbor array 120 would include 1029 entries, one for each "friend" of the user.

The "pointed-to" entry in neighbor array 120 that is "pointed to" by a "pointing" entry in node array 110 indicates that the node represented by the "pointed-to" entry is a "neighbor" of the node represented by the "pointing" entry. For example, entry 112 in node array 110 may include an index value (e.g., '1') that corresponds to entry 122 in neighbor array 120. Thus, with respect to entry 122, entry 122 is a "pointing" entry. Entry 112 is the second position in node array 110. If each node in a graph (that comprises N nodes) is given a unique value from 0 to N−1, then entry 112 corresponds to node '1' which can be used to index into node array 110 at the second position. Entry 122 includes the value '5', indicating that it can be used to index into node array 120 at the sixth position.

The neighbors of a particular node indicated in node array 110 may be determined based on (1) the "pointed-to" entry (in neighbor array 120) that the "pointing" node indicates (or references) and (2) the entry (in neighbor array 120) that the node subsequent to the "pointing" node in node array 110 indicates (or references). For example, entry 112 indicates (or references) entry 122 in neighbor array 120. Entry 114 indicates (or references) entry 130. All entries between entry 122 and entry 130 (including entry 122 and excluding entry 130) are neighbors of entry 112. Thus, the neighbors of the node indicated by entry 112 are nodes 5, 10, 108, and 987.

The set of neighbors that are indicated in neighbor array 120 and that correspond to a particular node in node array 120 is referred to herein as the "neighbor list" of the particular node. Each neighbor list is indicated by a contiguous set of entries in neighbor array 120.

In an embodiment, each neighbor list in neighbor array 120 is sorted by node value. If each neighbor list in neighbor array 120 is not sorted initially, then each neighbor list may be ordered before common neighbors are identified or before triangles are counted.

In a related embodiment, an entry in node array 110 includes two values that are used to identify neighbors of the entry. For example, entry 112 may include the values '1' and '4'. The neighbor list of entry 112 may then be determined as the nodes between (and including) the second entry and the fifth entry in neighbor array 120.

Finding Common Neighbors

A "common neighbor" of two nodes is a node that is connected to both nodes. For example, in a graph, if node A is connected to nodes C, D, and E and node B is connected to nodes D and G, then a common neighbor of nodes A and B is node D because node D is a neighbor of both node A and node B.

Given the node and neighbor representations in FIG. 1, two neighbor lists are identified using the values included in the entries that correspond to two nodes. Once the two neighbor lists are identified, common neighbors may be determined based on the two neighbor lists in one of multiple ways, some of which are described as follows.

Finding Common Neighbors

Linear Searching

Figure 2:
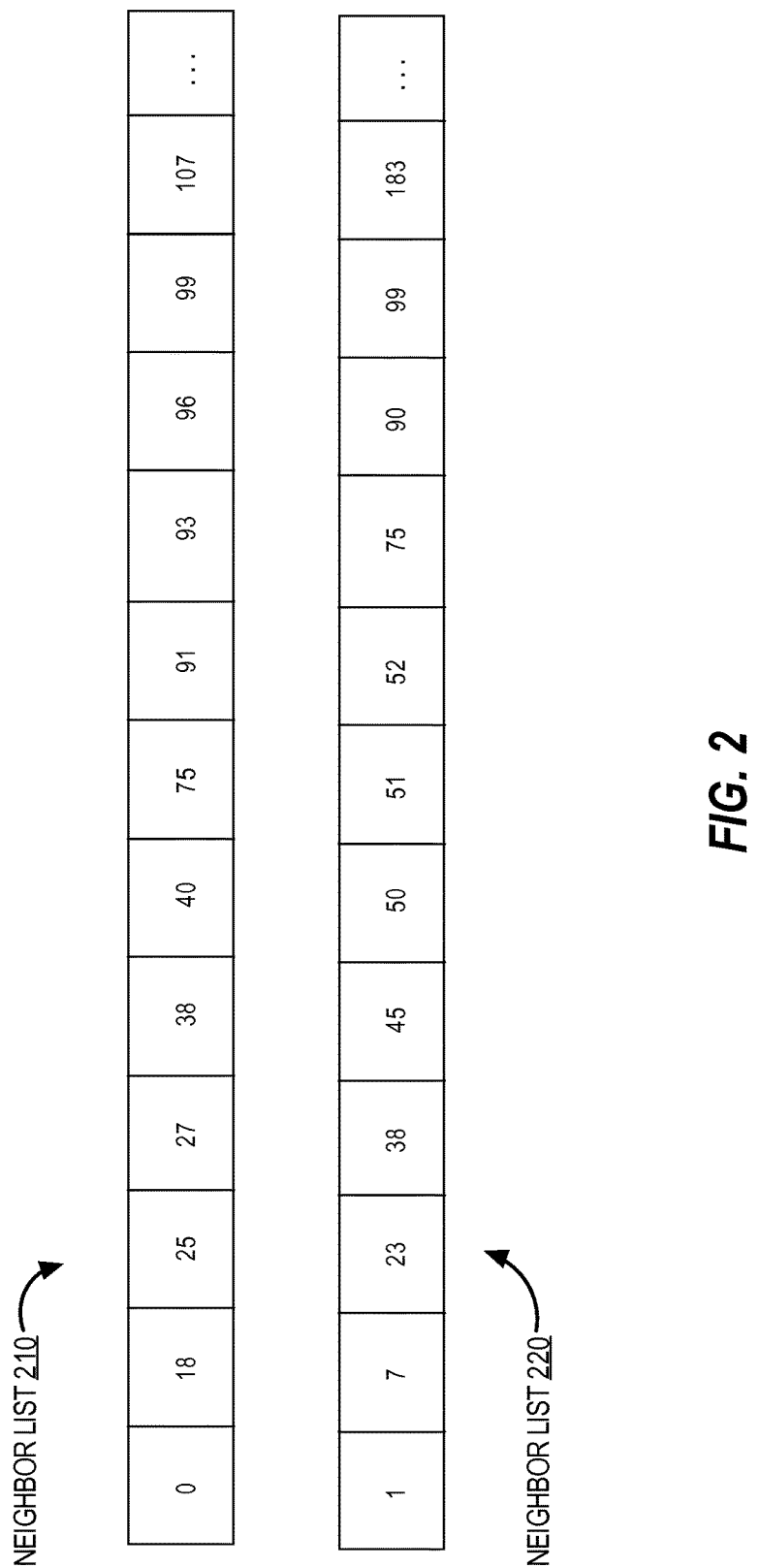
FIG. 2 is a block diagram that depicts two example neighbor lists.

In an embodiment, given two sets of neighbor nodes, common neighbors are identified in a linear fashion. FIG. 2 is a block diagram that depicts two example neighbor lists: neighbor list 210 and neighbor list 220.

Figure 3:
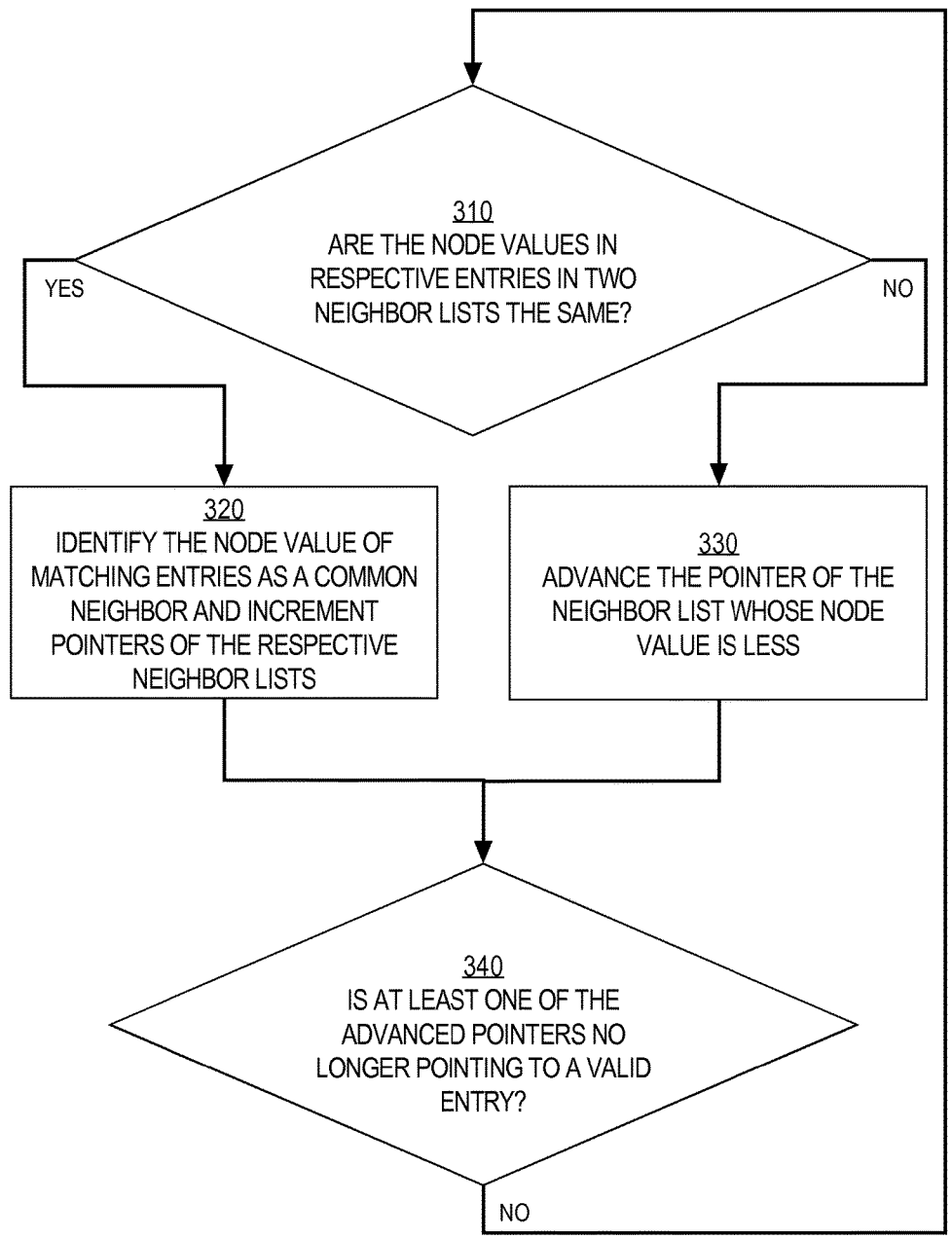
FIG. 3 is a flow diagram that depicts a linear search process for identifying common neighbors given two neighbor lists, in an embodiment.

FIG. 3 is a flow diagram that depicts a linear search process 300 for identifying common neighbors given two neighbor lists, in an embodiment. Process 300 is described using the example neighbor lists of FIG. 2. Process 300 may be implemented using two pointers or index values that initially refer, respectively, to the first entries for neighbor lists 210 and 220. Alternatively, the pointers (or index values) for neighbor lists 210 and 220 may refer to the last entries in the respective neighbor lists. Thus, while process 300 is described using the former (first-to-last) scenario, process 300 may be performed using the latter (last-to-first) scenario.

At block 310, the values of the "pointed to" entries are compared to determine whether the values match. If so, then process 300 proceeds to block 320. Else, process 300 proceeds to block 330. For example, initially, '0' is compared to '1'. Because '0' does not equal '1', process 300 would proceed to block 330. As another example, if the pointed to entries are the fifth entry in neighbor list 210 and the fourth entry in neighbor list 220, then process 300 would proceed to block 320 because '38' equals '38'.

At block 320, the node that corresponds to the value is identified as a common neighbor and the pointers of both neighbor lists are incremented by one. Process 300 then proceeds to block 340. For example, if '38' is compared to '38', then '38 may be identified as a common neighbor. Additionally or alternatively, a counter (that keeps track of the number of triangles counted so far for a graph) may be incremented.

At block 330, (when it is determined that the values do not match) the pointer that points to the lower value advances, for example, to the next entry in the corresponding neighbor list. For example, given neighbor lists 210 and 220, it is initially determined that '0' and '1' do not match and the pointer for neighbor list 210 advances to the next entry in neighbor list 210. As another example, if the pointers for neighbor lists 210 and 220 are pointing at the third position in the respective lists, then the pointer for neighbor list 220 advances to the next entry in neighbor list 220 (because '23' is less than '25').

Alternatively, at block 330, if process 300 is performed using the last-to-first scenario, then (when it is determined that the values do not match) the pointer that points to the larger value advances to the next entry in the corresponding neighbor list. For example, if the pointer for neighbor list 210 points to the entry with value '96' and the pointer for neighbor list 220 points to the entry with value '90', then the pointer for neighbor list 210 advances to the next entry in neighbor list 210 (because '96' is greater than '90').

After block 330 is performed, process 300 proceeds to block 340.

At block 340, it is determined whether at least one pointer that has been advanced (whether as a result of block 320 or block 330) is no longer pointing to an entry in its corresponding neighbor list. A positive determination indicates that all the entries in at least one of the neighbor lists have been considered and no additional entries are candidates for further consideration. If not, then process 300 proceeds to block 310. In other words, there is still at least one entry in each neighbor lists to process. Otherwise, if at least one advanced pointer is no longer pointing to an entry in its corresponding neighbor list, then process 300 may end with respect to neighbor lists 210 and 220. For example, after comparing the values of the last entries in neighbor lists 210 and 220, the pointer for neighbor list 210 advances; but after doing so, the pointer no longer points to any entry in neighbor list 210.

Finding Common Neighbors: Binary Splitting

Figure 4:
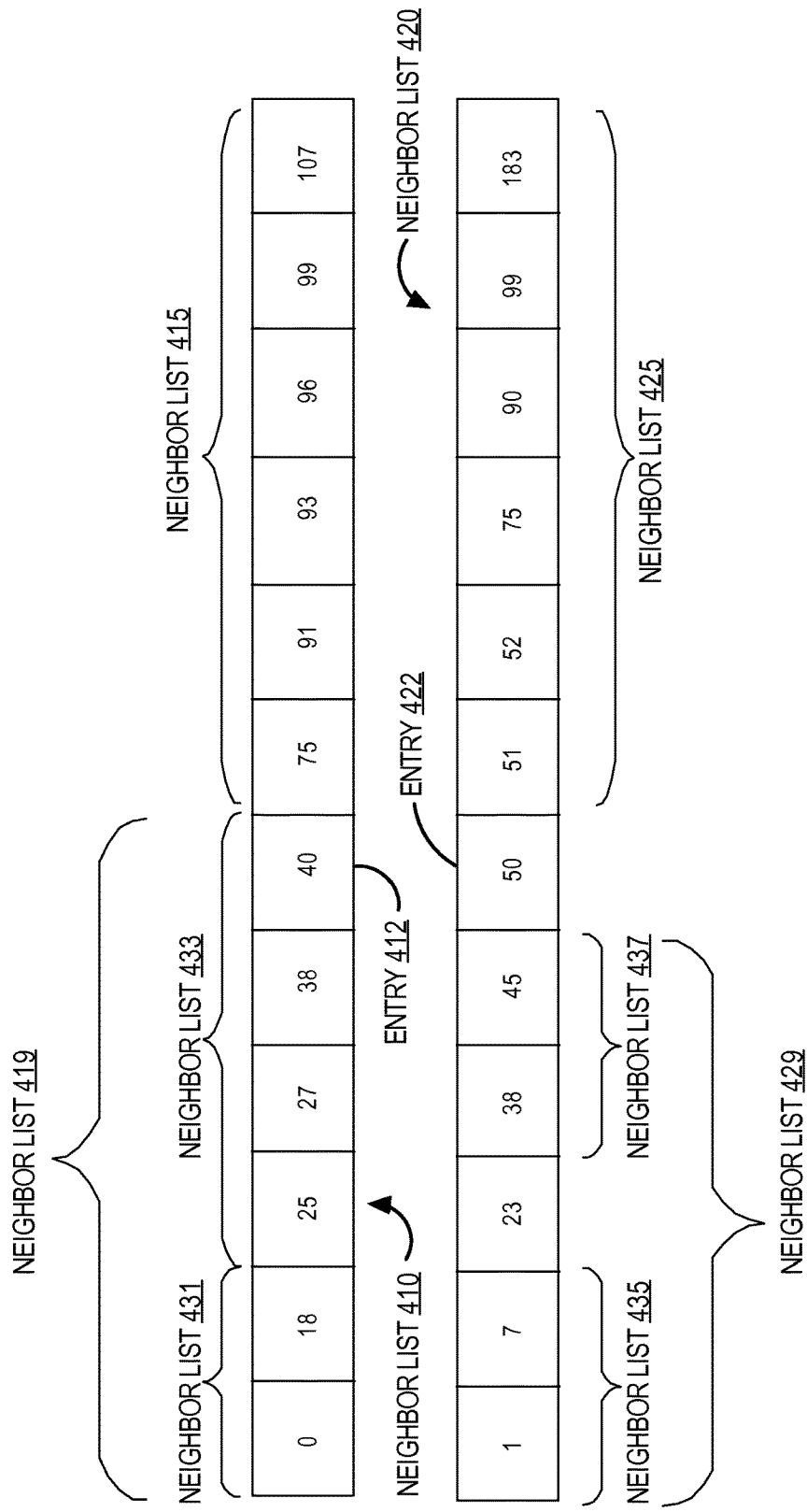
FIG. 4 is a block diagram that depicts example neighbor lists.

In an embodiment, common neighbors are identified using a binary splitting approach. FIG. 4 is a block diagram that depicts example neighbor lists 410 and 420.

Figure 5A:
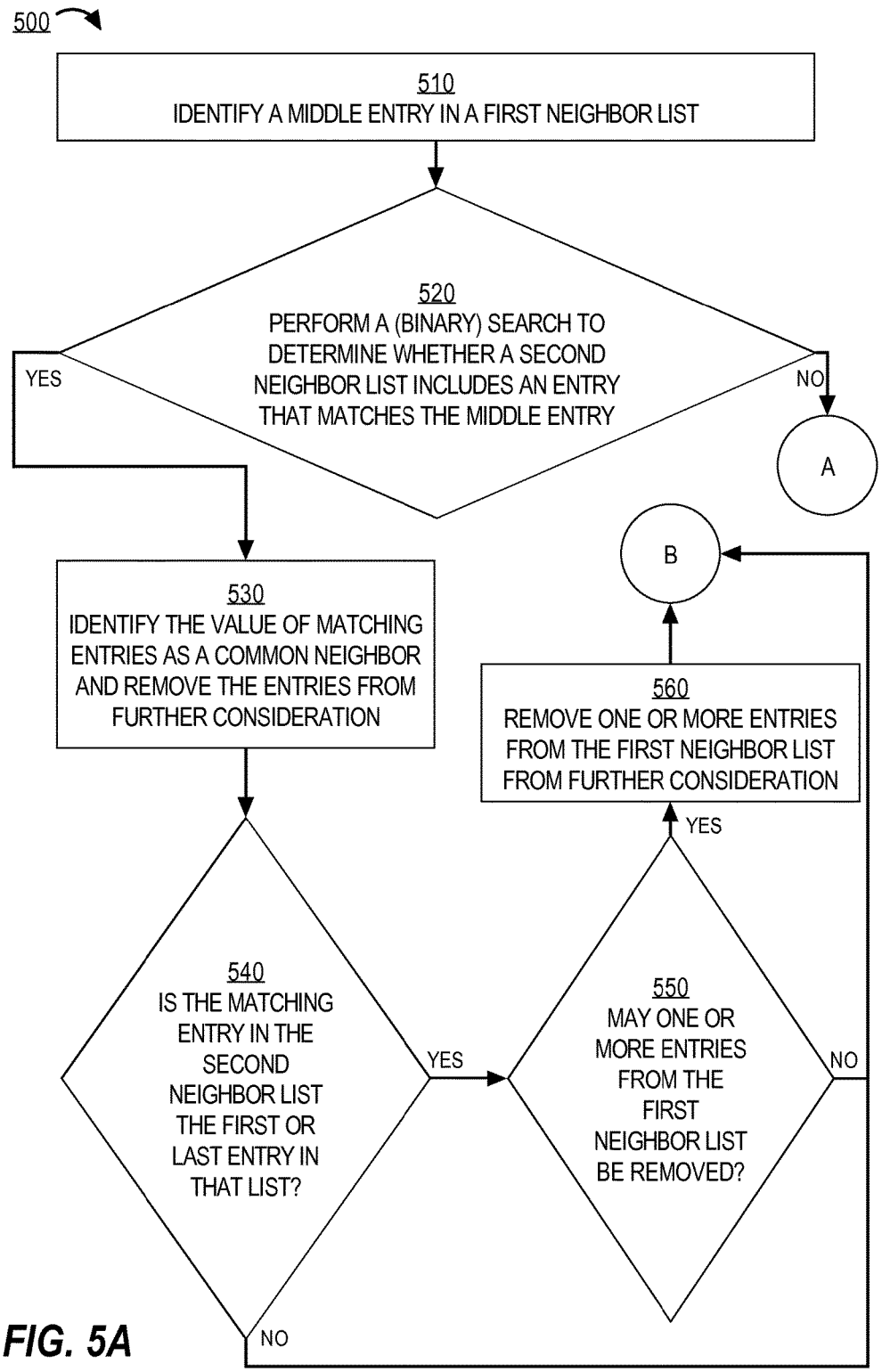
FIGS. 5A-5B are flow diagrams that depict a binary splitting process for identifying common neighbors, in an embodiment.
Figure 5B:
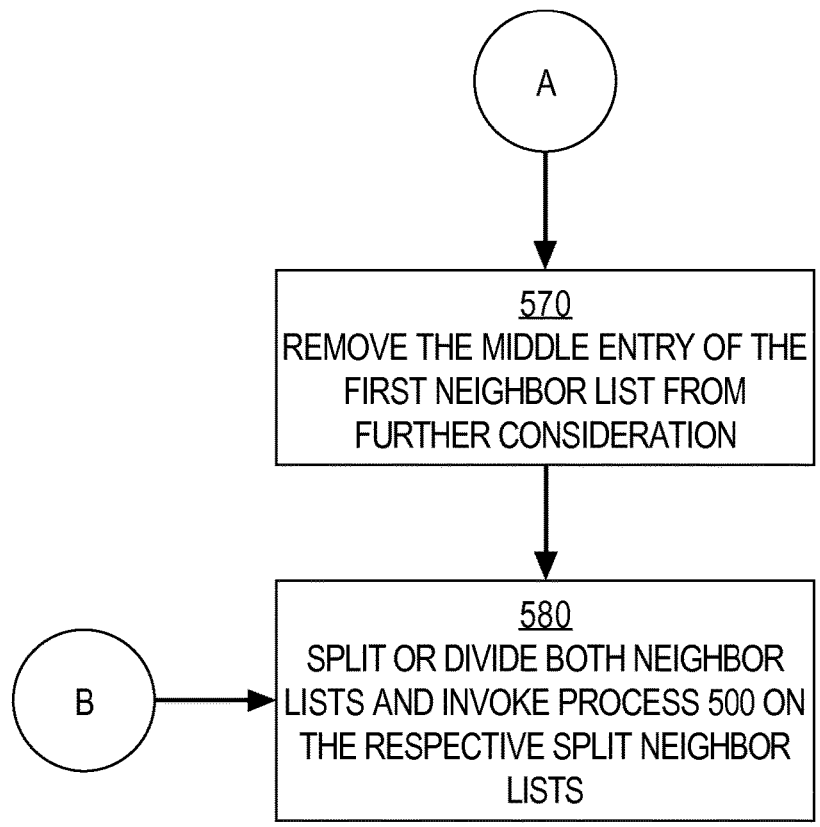

FIGS. 5A-5B are flow diagrams that depict a binary splitting process 500 for identifying common neighbors, in an embodiment. Process 500 is a recursive process that is invoked multiple times based on subsets of the original neighbor lists. For example, process 500 may be initiated by a function call (e.g., "binarySplitCommonNeighborSearch (List x, List y)") that takes, as input, two neighbor lists. The neighbor lists of FIG. 4 are used to describe multiple iterations of process 500.

At block 510, a "middle" entry in one of two neighbor lists is identified. Such an entry may be identified by dividing the size of the neighbor list by two and using the result to index into the neighbor list. The neighbor list from which the middle entry is identified may be selected in any number of ways. For example, the neighbor list may be selected at random or the neighbor list that is larger between the two neighbor lists is selected. If one of the two neighbor lists has only a single entry, then that neighbor list may be selected even though the other neighbor list is longer.

Initially, the neighbor lists are complete neighbor lists of two different nodes. However, for subsequent invocations of process 500, the neighbor lists are strict (or proper) subsets of the corresponding complete neighbor lists. For example, a subsequent performance of block 510 may be with respect to neighbor list 415 (which is a subset of neighbor list 410) and neighbor list 425 (which is a subset of neighbor list 420).

At block 520, a search is performed in the other neighbor list to determine whether an entry in the other neighbor list includes the value of the middle entry identified in block 510. If so, process 520 proceeds to block 530. Else process 500 proceeds to block 570.

The search in block 520 may be a linear search (described above with respect to FIG. 3) or a binary search. A binary search may be performed in one of multiple ways. For example, after entry 422 is identified in neighbor list 420 in block 510, entry 412 is identified in neighbor list 410 because entry 412 is considered a "middle" entry in neighbor list 410. For example, size of neighbor list 410 (12)÷2=6 (position in neighbor list 410). If the node value of entry 422 is greater than the node value of entry 412, then the node value of entry 422 is compared to the node value of an entry "in the middle of" neighbor list 415, such as node value '93'. If the node value of entry 422 is less than the node value of that "new" middle entry, then the node value of entry 422 is compared to the node value of an entry that is between entry 412 and that middle entry (such as the entry with node value '73'). The process repeats until a match is found or it is determined that neighbor list 410 does not contain a matching entry.

In an embodiment, during a binary search, instead of first checking a middle entry in a neighbor list, another entry in the neighbor list is selected based on the node value that is being search for in the neighbor list. For example, if the searched-for node value is close to one of the endpoints of the range of node values in the to-be-searched neighbor list (or subset thereof), then a linear or semi-linear (e.g., skipping two or three entries at a time) search may be performed. For example, if searched-for node value is '13' and the range of values of a neighbor list is 12-28, then a search for node value '13' begins with the first (or second) entry in the neighbor list.

At block 530, if there is a match determined in block 520, then the node value is identified as a common neighbor. For example, the node value is stored for later user and/or a global count variable is incremented indicating that a common neighbor has been found. Both entries are removed from future consideration of the respective neighbor lists.

At block 540, it is determined whether the entry identified in block 520 is the first or last entry in the neighbor list. If so, then process 500 proceeds to block 550, where it is determined whether one or more entries from the other neighbor list may be removed. If so, then process 500 proceeds to block 560, where one or more entries are removed from consideration. Otherwise, process 500 proceeds to block 580.

If the determination in block 540 is true, then it is likely that one or more entries may be removed from consideration. For example, if: (1) the neighbor lists in consideration are neighbor lists 415 and 425, (2) it is determined that '75' is found in both neighbor lists, and (3) '75' is the first entry in neighbor list 415, then the entries that precede the '75' entry in neighbor list 425 may be removed since it is impossible that any of those entries may be found in neighbor list 415. Specifically, the entries that include '51' and '52' are removed from consideration.

At block 570, the middle entry (identified in block 510) is removed from consideration.

At block 580, each neighbor list is split into two neighbor lists. For example, after determining that '50' is not found in neighbor list 410, neighbor list 410 is split into neighbor lists 415 and 419 (for example, based on where a matching entry would have been if such a matching entry existed in neighbor list 410) and neighbor list 420 is split into neighbor lists 425 and 429.

As another example, if the neighbor lists are 419 and 429, then neighbor list 419 is split into neighbor lists 431 and 433 and neighbor list 429 is split into neighbor lists 435 and 437. Process 500 is then performed with respect to neighbor lists 431 and 435 and is performed with respect to neighbor lists 433 and 437.

Finding Common Neighbors: Hybrid Search

In an embodiment, a linear search process and a binary splitting search process are both used to identify common neighbors (if any) among two neighbor lists. Such an approach for identifying common neighbors is referred to herein as a "hybrid search." One implementation of a hybrid search may involve beginning with a binary splitting search and then switching to a linear search after certain criteria are met, such as the size of the neighbor lists, which may or may not be a subset of original neighbor lists.

Figure 6:
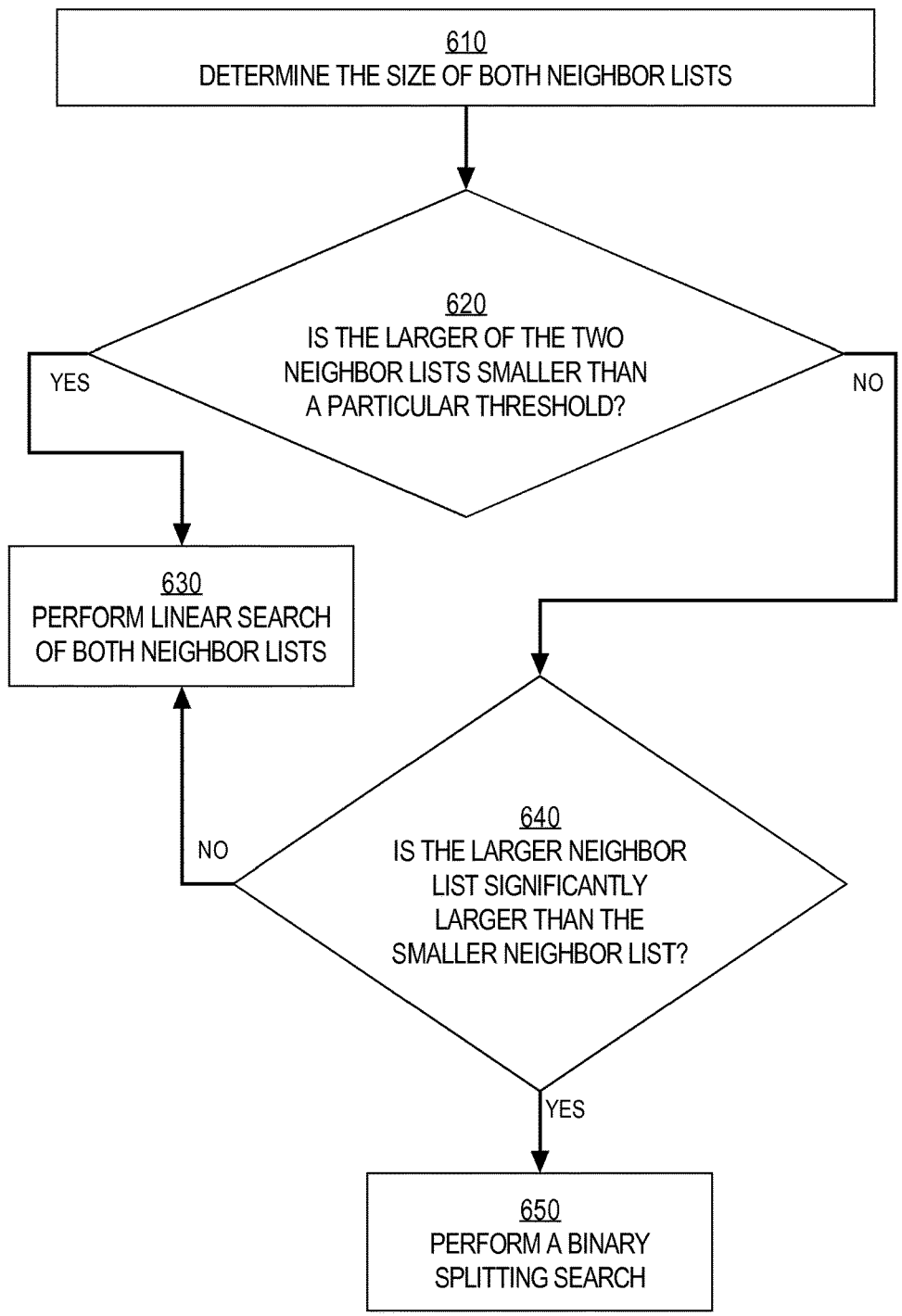
FIG. 6 is a flow diagram that depicts a hybrid search process, in an embodiment.

FIG. 6 is a flow diagram that depicts a hybrid search process 600, in an embodiment. Process 600 may be performed before two neighbor lists are analyzed for common neighbors or after at least a portion of two neighbor lists have been analyzed for common neighbors. For example, process 600 may be performed after one common neighbor has been found using a binary splitting search approach.

At block 610, the size of each neighbor list is determined. The size" of a neighbor list refers to the number of nodes indicated in the neighbor list.

At block 620, it is determined whether the larger of the two neighbor lists is less than a particular threshold, such as 10,000 neighbors. If so, then, at block 630, a linear search is performed. In other words, if both neighbor lists are relatively small, then performing a linear search is likely to require less processing power (e.g., in terms of memory and/or CPU cycles) than performing a binary splitting search, where there may be a performance penalty as a result of recursion. Else, process 600 proceeds to block 640.

At block 640, it is determined whether the larger of the two neighbor lists is significantly larger than the smaller of the two neighbor lists. For example, if the size of the larger of the two neighbor lists (|Nu|) is more than three times larger than the size of the smaller of the two neighbor lists (|Nv|), then Nu is considered significantly larger than Nv.

If the determination at block 640 is positive, then, at block 650, a binary splitting process is performed. If block 650 is performed, then the neighbor lists are larger than the particular threshold and differ significantly in size. When two neighbor lists differ in size to a certain degree, then, due to the relatively smaller size of the neighbor list, a binary splitting search allows a significant number of nodes from the larger neighbor list to be removed and never be considered.

If the determination at block 640 is negative, then process 600 proceeds to block 630 where a linear search is performed. If block 630 is performed after block 640, then the neighbor lists are larger than the particular threshold and are similar in size. If neighbor lists are similar in size, then it is likely that a binary splitting search may not remove a significant number of nodes from consideration and the overhead of implementing a recursive approach may be greater than any computational savings from doing binary searches.

Finding Common Neighbors: Segmenting Approach

In an embodiment, common neighbors are identified by creating a segmenting index for one of two neighbor lists and searching for a particular node indicated in the other neighbor list using the segmenting index. A segmenting index is data structure that logically partitions the value range of a neighbor list by a certain factor, referred to herein as the "delta factor."

Figure 7:
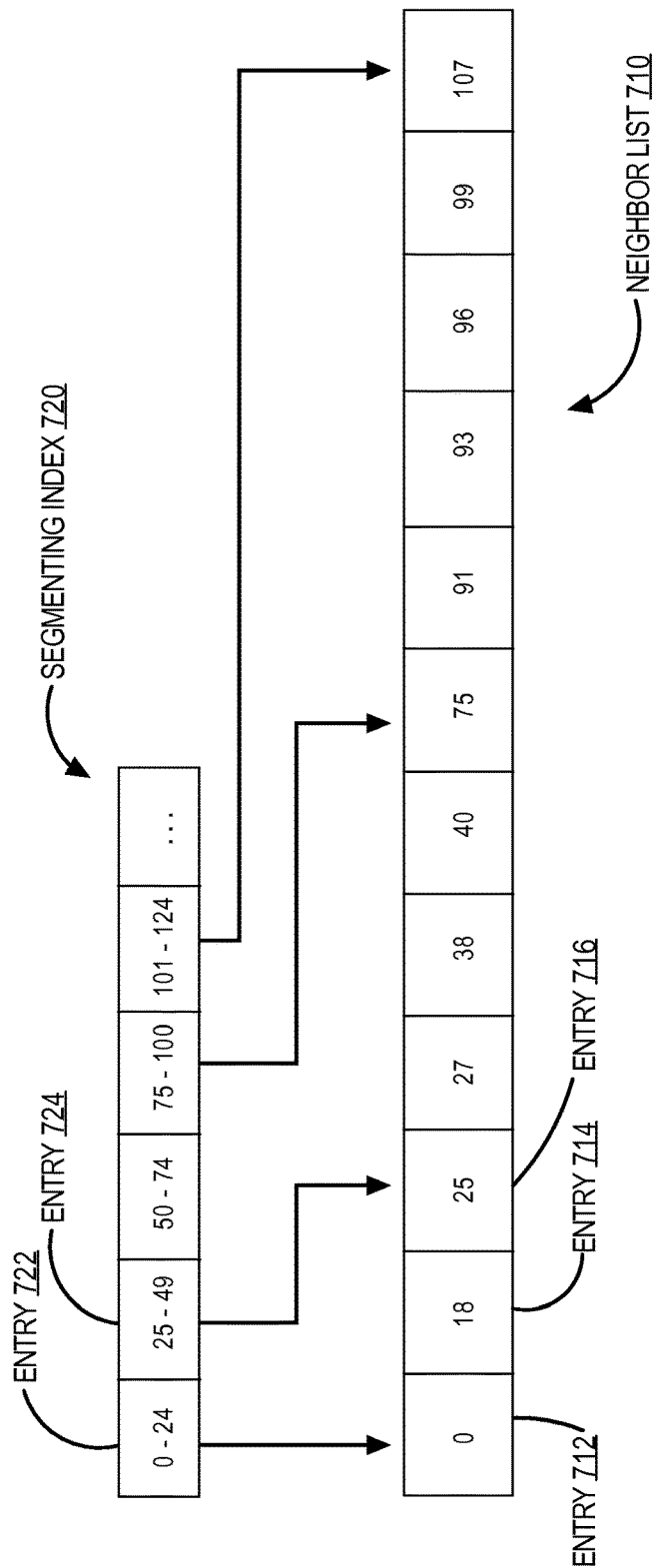
FIG. 7 is a block diagram that depicts an example neighbor list and its corresponding segmenting index, in an embodiment.

FIG. 7 is a block diagram that depicts an example neighbor list 710 and its corresponding segmenting index 720, in an embodiment.

Figure 8A:
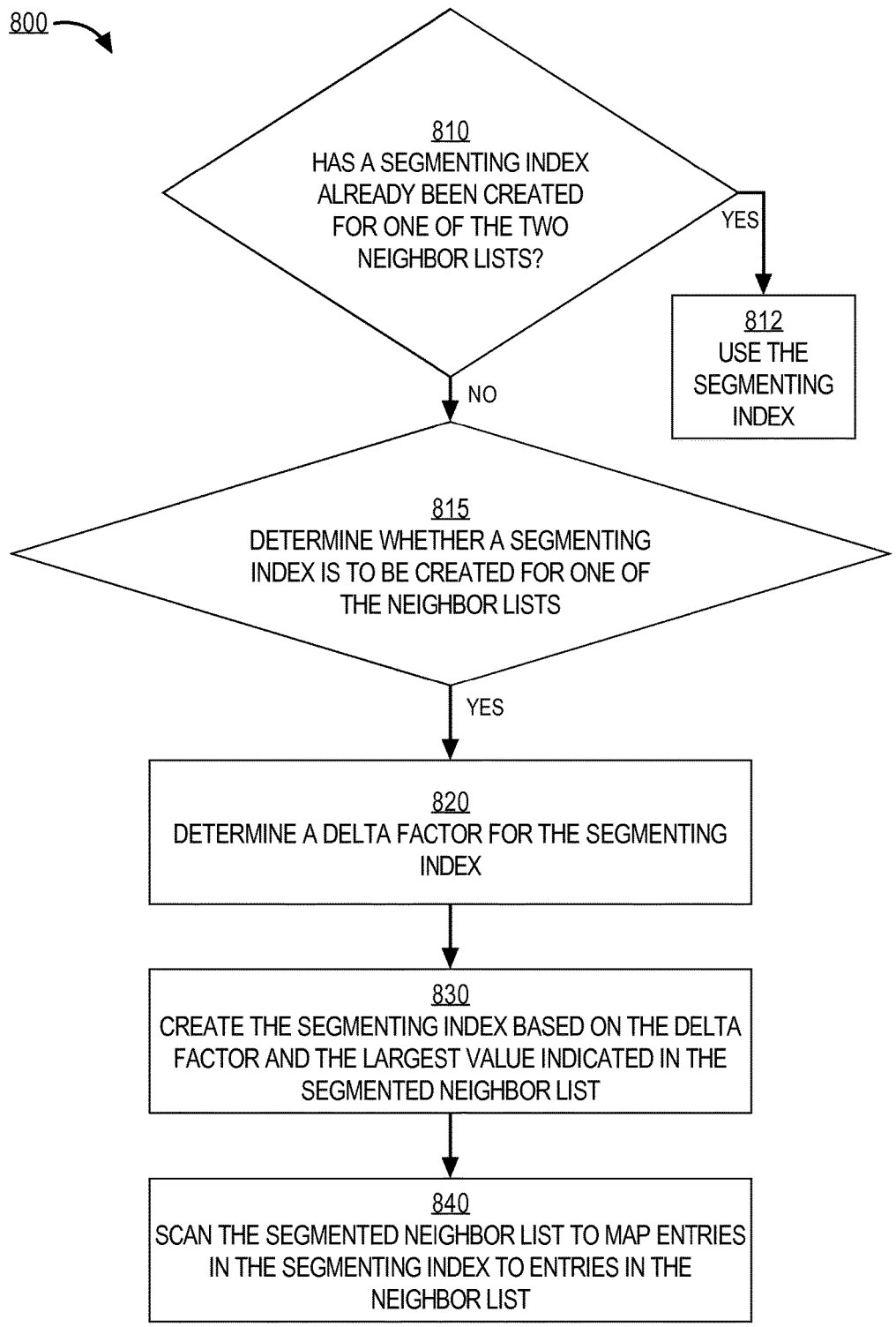
FIG. 8A is a flow diagram that depicts a process for creating a segmenting index, in an embodiment.

FIG. 8A is a flow diagram that depicts a process 800 for creating a segmenting index, such as segmenting index 720, in an embodiment.

At block 810, it is determined whether a segmenting index has already been created for one of the two neighbor lists that are part of a common neighbor determination. If not, then process 800 proceeds to block 815. Otherwise, process 800 proceeds to block 812, where the already-created segmenting index is used to determine common neighbors (for example, using process 850 in FIG. 8B, described below).

If a segmenting index has been created for both neighbor lists that are in question, then block 812 may involve selecting one of the two segmenting indexes based on one or more selection criteria. An example selection criterion is which neighbor list is larger. For example, if neighbor list A is larger than neighbor list B, then the segmenting index for neighbor list A is used instead of the segmenting index for neighbor list B. Another example selection criterion is which segmenting index is more "dense." The "density" of a segmenting index refers to the ratio of the number of nodes in a neighbor list to the number of entries in the corresponding segmenting index. The higher the ratio, the higher the "density" of the segmenting index.

Alternatively, if a segmenting index has been created for both neighbor lists, then, instead of using either segmenting index, a binary split and linear scan is performed.

At block 815, it is determined whether a segmenting index is to be created. Such a determination may be based on multiple factors. For example, a segmenting index is created for the larger of two neighbor lists only if the larger neighbor list is greater than a first threshold size, such as 40,000 entries. If both neighbor lists are considered "large" or are roughly equal in size, then a linear or binary search may be used instead of creating a segmenting index.

In a related example, a segmenting index is created only if the smaller neighbor list is greater than a second threshold size, such as ten. For example, if there is only one entry in the smaller neighbor list, then it may be more efficient to just perform a linear search or a binary search of the larger neighbor list, even if the larger neighbor list is significantly greater than the first threshold size.

A segmenting index is different in multiple ways from a hash table that is used when performing a hash join of two relations or tables. While both may be approaches to find common values in two sets of values, a hash join involves creating a hash table based on column values of the smaller of the two relations and then probing the hash table base on column values from the larger table. A segmenting index does not involve generating hash values and may be generated on the larger of two neighbor lists. Also, a segmenting index preserves and leverages the order in the neighbor lists while a hash table does not preserve order.

At block 820, if it is determined that a segmenting index should be created, a delta factor is determined. The delta factor indicates a range of values in the to-be-segmented neighbor list that is to be represented by each entry (or at least a majority of entries) in the segmenting index. The delta factor may be pre-defined (or "hard-coded") or may be variable based on one or more factors, such as the size of the larger neighbor list, the size of the smaller neighbor list, and/or the range of values in the larger neighbor list. For example, the larger the to-be-segmented neighbor list, the larger the delta factor. As another example, the smaller the other neighbor list, the larger the delta factor. In the example of FIG. 7, the delta factor is 25.

At block 830, the segmenting index is created based on the delta factor and the largest value indicated in the neighbor list. For example, if the largest value in neighbor list 710 is 10,532 and the delta factor is 25, then 422 entries in the segmenting index are created. Each entry in mapped to a different value range. For example, the first entry maps to value range 0-24, the second entry maps to value range 25-49, etc.

At block 840, the neighbor list of the segmented index is scanned to map index entries to entries in the neighbor list. For each entry in the neighbor list, it is determined to which value range the value indicated in the entry belongs. For example, in FIG. 7, it is determined that '0' is in the value range 0-24 and, thus, the first index entry in segmenting index 720 is mapped to (or is caused to reference or point to) the first entry (i.e., entry 712) of neighbor list 710. The value indicated in the second entry (i.e., entry 714) in neighbor list 710 is then compared to the value range of the first index entry (i.e., entry 722). Because '18' is within value range 0-24, segmenting index 720 is not updated. The value indicated in the third entry (i.e., entry 716) in neighbor list 710 is compared to the value range of the first index entry. Because '25' is not within value range 0-24, '25' is compared to the value range that corresponds to the next entry (i.e., entry 724) in segmenting index 720. Because '25' is within value range 25-49, entry 724 is updated to point to (or reference) entry 716. This process continues until all the entries in neighbor list 710 are analyzed.

Figure 8B:
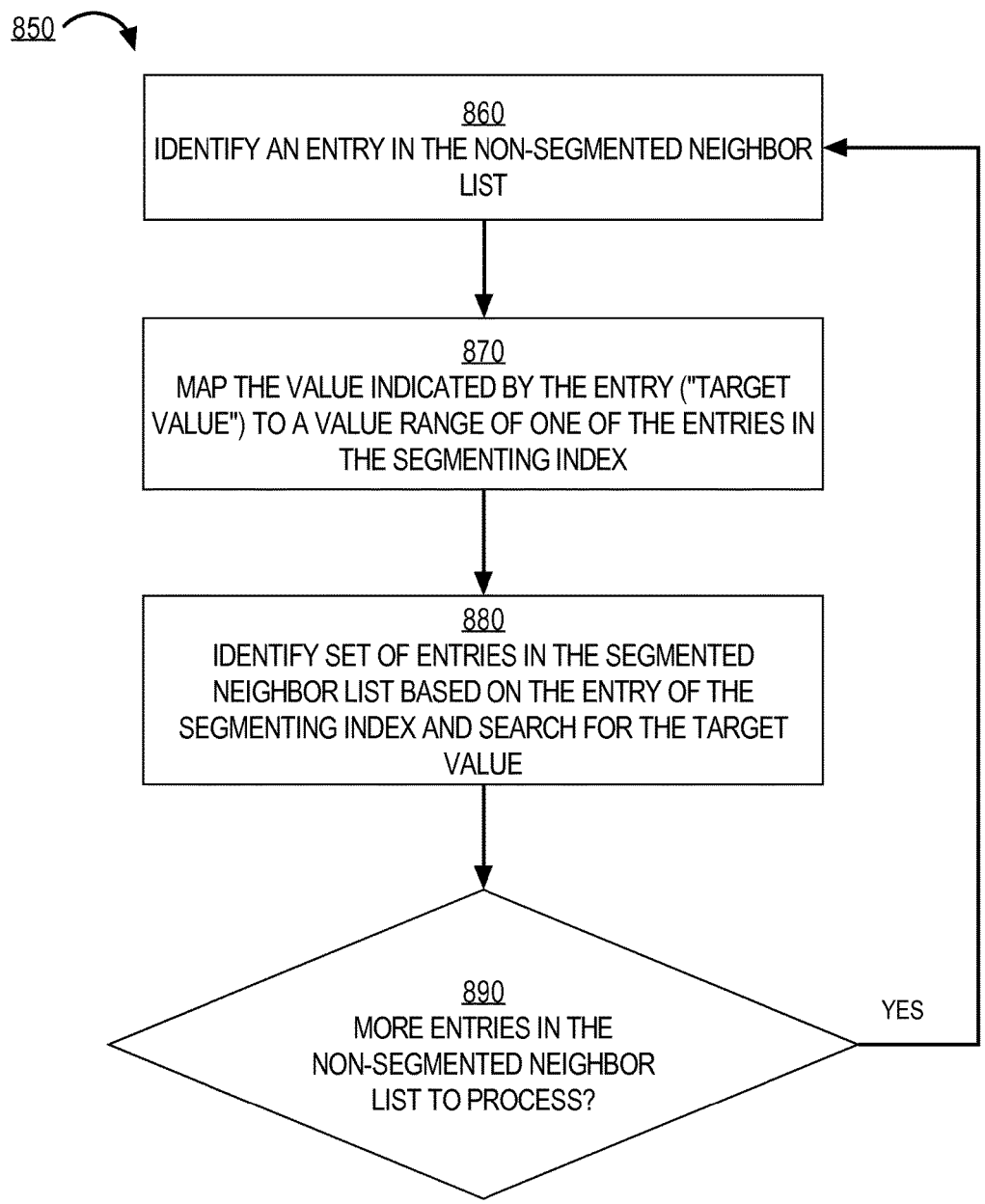
FIG. 8B is a flow diagram that depicts a process for using a segmenting index when searching for common neighbors, in an embodiment.

FIG. 8B is a flow diagram that depicts a process 850 for using a segmenting index, such as segmenting index 720, when searching for common neighbors, in an embodiment.

At block 860, an entry in the non-segmented neighbor list is identified. Initially, the entry may be the first entry in the neighbor list or the last entry in the neighbor list. However, the entries in the non-segmented neighbor list may be traversed in any order. If the entries are traversed in ascending (or descending) order, then optimization may be applied in the searching block (880) where certain entries, in the non-segmenting neighbor list, may be removed from consideration during the search block. For example, if two nodes (a first node (e.g., '5') and a second node (e.g., '11')) in a non-segmented neighbor list map to the same entry in segmenting index, and the first node ('5') is smaller than the second node ('11'), then any nodes in the segmented neighbor list that are less than the first node ('5') are removed from consideration because it is known that the second node ('11') is larger than the first node ('5') and it is not possible for the second node ('11') to match any node that is smaller than the first node ('5').

At block 870, the value indicated by the identified entry is mapped to one of the multiple value ranges of the index entries of the segmenting index. For example, if the value is '31' and the delta factor is 25 (as in FIG. 7), then the appropriate entry in the segmenting index is identified by dividing the value by the delta factor and decreasing the result to the next whole number if the result is not a whole number itself. In this example, 31÷25=1.24, which is then reduced to 1.

At block 880, the corresponding entry of the segmenting index is identified and used to identify a set of entries in the segmented neighbor list. The value is searched for within the set of entries of the neighbor list. The search may be a linear search or a binary search. If the value is found in the set of entries, then that value is identified as a common neighbor and a global count variable may be incremented. Also, the entry may be removed from the segmented neighbor list so that that entry is not considered again during process 850.

At block 890, it is determined whether there any more entries in the non-segmented neighbor list to process. If so, then process 850 proceeds to block 860. Else, process 850 may end.

Finding Common Neighbors: Pruning

In an embodiment, one or more entries from one or both neighbor lists may be removed (or "pruned") before performing a search of one of the neighbor lists based on each of the one or more removed entries. The removal of entries is based on the value of the nodes whose neighbor lists are being compared. For example, neighbor list A of node '8' includes 0, 12, 25, 27, 38, 40, and 75 while neighbor list B of node '30' includes 1, 7, 12, 38, 45, 50, and 51. The greater of the two nodes is identified. In this example, node '30' is identified. This value is set as a minimum value and is used to identify one or more entries in each of neighbor lists A and B. Because the first four entries in neighbor list A are less than 30, neighbor list A is pruned to remove those four entries and, as a result, includes only 38, 40, and 75. Similarly, because the first three entries in neighbor list B are less than 30, neighbor list B is pruned to remove those four entries and, as a result, now includes only 38, 45, 50, and 51.

After pruning of one or two neighbor lists is performed, any of the foregoing approaches may be used to identify common neighbors in the two neighbor lists, such a linear search, a binary splitting search, or a segmenting index search.

A reason why such pruning may be performed is because a common neighbor may have already been determined previously. Given neighbor lists (A and B) for node '8' and node '30' above, both lists include node '12'. In a neighbor list for node '12', node '30' (which is also a neighbor of node '8') would also be identified. When the neighbor lists of node '8' and node '12' are analyzed for common neighbors, node '30' will be identified, which identification may occur before or after neighbor lists A and B are analyzed for common neighbors. Thus, node '12' does not have been included in either of neighbor lists A and B when determining common neighbors for nodes '8' and '30'.

Finding Common Neighbors: Compiler Optimization

In an embodiment, a compiler is configured to analyze application code to identify graph-related patterns within the application and determine whether other code may be inserted into the application code. The application code may be written in a high-level programming language, such as C++ or Java, or in a Domain Specific Language (DSL), such as Green-Marl, Gremlin, or Scala.

An example of a graph-related pattern that the compiler identifies is one that iterates through each neighbor of a particular node and, for each neighbor, a conditional statement appears. For example, the application code may be the following:

```
Foreach (X: Y.Nbrs){
    // any number of statements
}
```

If such a graph-related pattern is identified, then the compiler determines if the node whose neighbors are iterated over (i.e., 'Y' in the above example) is defined as a neighbor of another node, such as 'Z'. Node 'Z' should not be modified between the definition of Y and the graph-related pattern identified above. For example, a portion of the application code for node 'Z' may be "Y: Z.Nbrs".

If all of the above two checks/determinations are true, then the graph-related pattern identified in the application code is transformed. For example, the example of application code above may be transformed into:

```
Foreach (X: CommonNbrs(Y, Z)){
    // any number of statements
}
``` where "CommonNbrs" is a function that efficiently identifies common neighbors given two neighbor lists as input. The function may implement a segmenting index approach, a binary splitting approach, a linear search approach, or any combination of the three approaches. For example, for one set of neighbor lists that are analyzed for common neighbors, a segmenting index may be created, while for another set of neighbor lists, a binary splitting approach is used to identify common neighbors in that set of neighbor lists.

Counting Triangles

A triangle is a set of three distinct nodes where each node in the set is connected to each of the other nodes in the set. For example, A is connected to B and C and B is connected to C. Therefore, A, B, and C form a triangle. As noted previously, determining the number of triangles in a graph is useful in a number of real-world applications.

A naïve way to count triangles in a graph G is represented with the following pseudo code:

```
Int T = 0;
Foreach(u: G.Nodes) // look at each node in graph G
    Foreach (v: u.Nbrs) (v>u) // consider the neighbor (v) of each node u
        Foreach (w: u.Nbrs) (w>u) // consider a different neighbor
        (w) of each node u
            If (v.isNeighbor(w)) /* check if the two neighbors of node
            u are
                    neighbors of each other */
                T++; // if so, increase the count of triangles
Return T;
```

Such an approach takes an inordinate amount of time and computing resources. The following approaches significantly reduce the time and computing resources required to determine a number of triangles in a graph.

Counting Triangles: Pruning

As noted above, counting triangles involves identifying zero or more common neighbors for multiple pairs of nodes. In an embodiment, counting the number of triangles involves pruning one or more entries from one or both neighbor lists of two nodes prior to identifying any common neighbors. Such pruning may be performed regardless of how the common neighbors are identified, such as whether a linear search is used, a binary splitting approach is used, or a segmenting index is used.

For example, each neighbor list of two nodes is identified and analyzed to identify zero or more node values that are less than the greater of the node values of the two nodes. For example, if node '23' has a neighbor list of 4, 9, 17, 34, 103 and node '78' has a neighbor list of 34, 67, 89, and 161, then the neighbor list of node '23' is pruned to only include 103 (since the other values are less than 78) and the neighbor list of node '78' is pruned to only include 89 and 161 (since the other values are less than 78).

In an embodiment, pruning is performed in two stages. In the first stage, before any common neighbors are identified, the neighbor list of each node is analyzed to identify zero or more neighbors whose node values are less than the node value of the node. A node may have a node value that is greater than the node values of all nodes in the node's neighbor list. In that case, the entire neighbor list may be deleted. On the other hand, a node may have a node value that is less than the node values of all nodes in the node's neighbor list. In that case, no node value is removed from the node's neighbor list In the second stage, when two neighbor lists are identified and are about to be compared to identify common neighbors, the neighbor list of the lower node value is analyzed to identify zero or more neighbors whose node values are less than the node value of the higher node value. For example, given the two example neighbor lists above (i.e., node '23' having a neighbor list of 4, 9, 17, 34, 103 and node '78' having a neighbor list of 34, 67, 89, and 161), after the first stage, the respective neighbor lists would be 34 and 103 for node '23' and 89 and 161 for node '78'. During the second stage, the pruned neighbor list of node '23' is analyzed and additionally pruned to only include a single item: 103 (since 34 is less than 78).

Counting Triangles: Sorting and Pruning

In an embodiment, prior to finding common neighbors of pairs of nodes, the nodes in a node array, such as node array 110, are ordered based on their respective "degree." The "degree of a node" refers to the number of neighbors or edges that the node has in a graph. Thus, for example, a node that has only three neighbors has a degree of three.

Sorting nodes in a graph may also involve renaming the nodes. For example, prior to sorting, the node with the largest degree is identified as node '10'. After sorting, that node is renamed to node '21,647,894' where, for example, there are 21,647,895 nodes in a graph. If the original node identifiers (for example, IP addresses, email addresses, user account identifiers) are needed, then the mapping of node values to their respective original node identifiers may be updated to reflected the new node values.

After sorting the nodes based on degree, the neighbor list of each node is analyzed to determine whether to prune one or more entries of the neighbor list. The removal is based on the value of the node relative to the values indicated in the neighbor list of that node. Specifically, if a node value in a neighbor list is less than the node value that corresponds to the neighbor list, then that node value indicated in the neighbor list is removed. Thus, later, when common neighbors are determined for two sets of neighbor lists, those neighbor lists may be significantly reduced.

An effect of sorting and pruning is that the neighbor lists of high degree nodes are significantly reduced. For example, the neighbor list of the node with the largest degree is removed entirely, since there are no nodes that have an identifier (or value) that is larger than the node value of the node with the largest degree.

Counting Triangles: Compiler Optimization

As noted previously, a compiler may be configured to analyze application code to identify graph-related patterns within the application and determine whether other code may be inserted into the application code.

Figure 9:
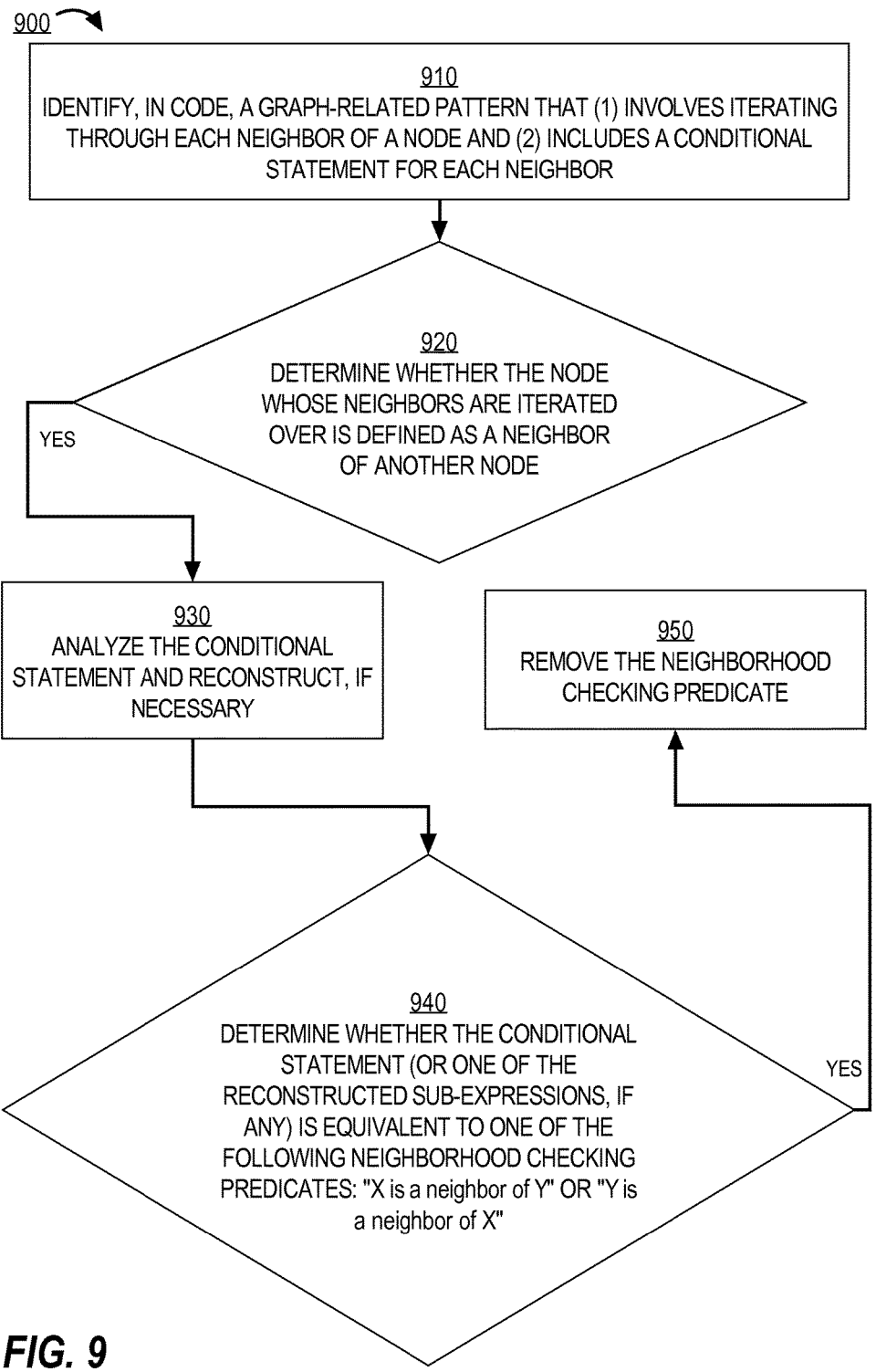
FIG. 9 is a flow diagram that depicts a process for optimizing code at compile time, in an embodiment.

FIG. 9 is a flow diagram that depicts a process 900 for optimizing code at compile time, in an embodiment. Process 900 is implemented by a compiler of a high-level programming language, such as C++ or Java, or of a Domain Specific Language (DSL).

At block 910, a graph-related pattern that (1) involves iterating through each neighbor of a particular node and (2) includes a conditional statement for each neighbor is identified in code. For example, the code may match the following graph-related pattern:

```
Foreach (X: Y.Nbrs){
    If ( boolean_expression ) {
        // any number of statements
    }
}
```

If such a graph-related pattern is identified in the code, then process 900 proceeds to block 920.

At block 920, it is determined whether the node whose neighbors are iterated over (i.e., 'Y' in the above example) is defined as a neighbor of another node, such as 'Z'. Node 'Z' should not be modified between the definition of Y and the graph-related pattern identified above. For example, a portion of the application code for node 'Z' may be "Y: Z.Nbrs". If the node whose neighbors are iterated over is defined as a neighbor of another node, then process 900 proceeds to block 930.

At block 930, the Boolean expression in the identified graph-related pattern is analyzed and reconstructed, if necessary, into a product-of-sum form. For example, "boolean_expression" is reconstructed as "(sub_expression1) && (sub_expression2) && . . . "

At block 940, it is determined whether the Boolean expression (or at least one of the reconstructed sub-expressions, if any) is equivalent to one of the following predicates: "X is a neighbor of Y" or "Y is a neighbor of X." If so, then process 900 proceeds to block 950.

At block 950, (i.e., after all of the above checks/determinations are true), the graph-related pattern identified in the code is transformed. For example, the example code above may be transformed into:

```
Foreach (X: CommonNbrs of (Y,Z)){
    If ( boolean_expression2 ) {
        // any number of statements
    }
}
``` where "boolean_expression2 is a sum-of-product form of the original "boolean_expression" but without the neighborhood checking predicate that corresponds to "X is a neighbor of Y" or "Y is a neighbor of X." In a related embodiment, the original "boolean_expression" is removed entirely and no other Boolean expression replaces that original expression. This may be the case if "boolean_expression" only indicates that "X is a neighbor of Y" or "Y is a neighbor of X."

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
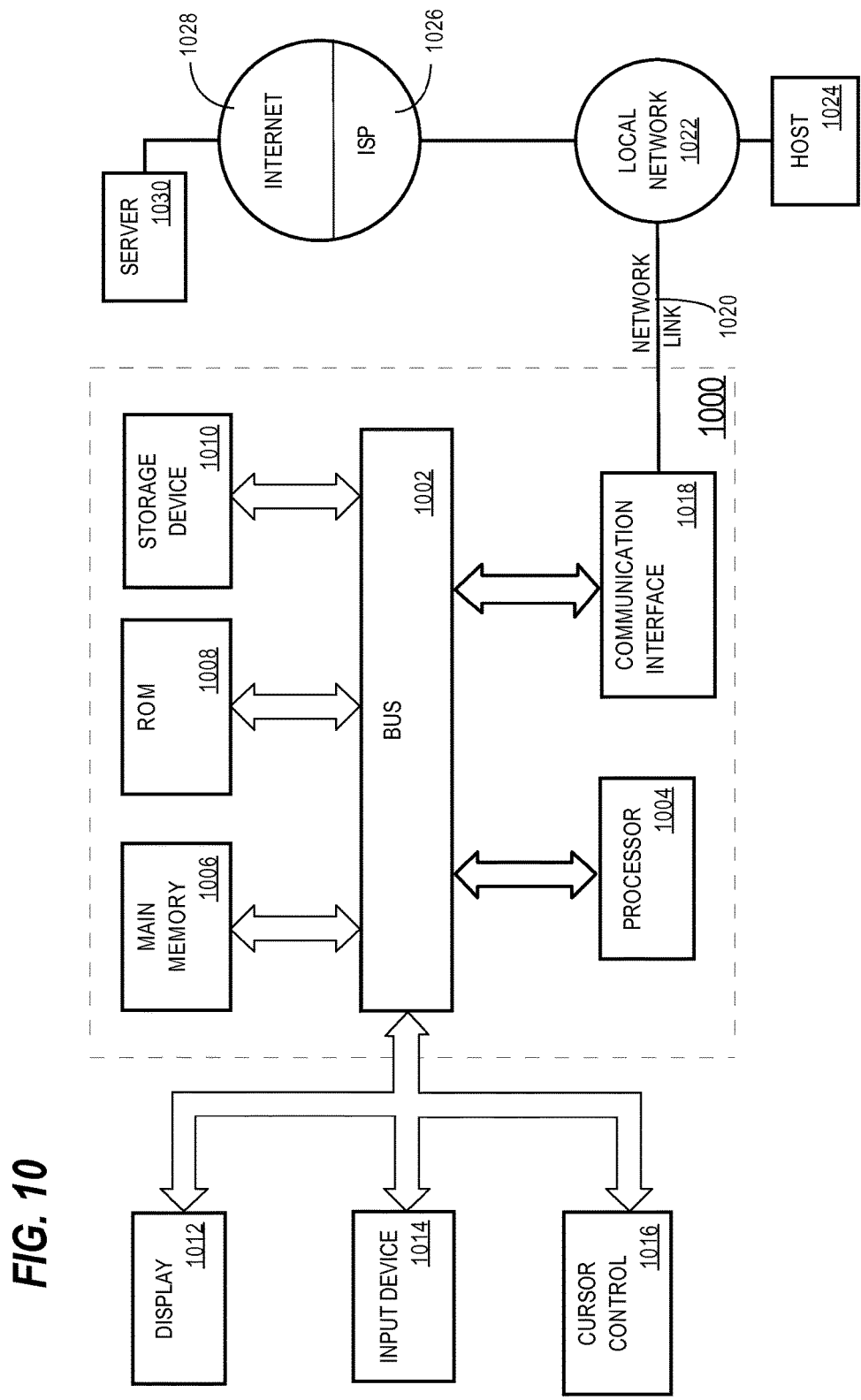
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for finding common neighbors of a first node and a second node in a graph that comprises a plurality of nodes that includes the first node and the second node, the method comprising:
identifying a first set of neighbors for the first node;
identifying a second set of neighbors for the second node;
identifying a first neighbor in the first set of neighbors;
based on the first neighbor, identifying, in the second set of neighbors, a second neighbor that matches or nearly matches the first neighbor;
if the first neighbor matches the second neighbor, then storing data that identifies the first neighbor as a common neighbor of the first node and the second node;
based on the first neighbor, dividing the first set of neighbors into a first subset and a second subset, wherein the first subset indicates one or more first neighbors whose values are less than a value of the first neighbor, wherein the second subset indicates one or more second neighbors whose values are greater than the value of the first neighbor;
based on the second neighbor, dividing the second set of neighbors into a third subset and a fourth subset, wherein the third subset indicates one or more third neighbors whose values are less than a value of the second neighbor, wherein the fourth subset indicates one or more fourth neighbors whose values are greater than the value of the second neighbor;
identifying the first subset and the third subset;
identifying a third neighbor in the first subset;
based on the third neighbor, identifying, in the third subset, a fourth neighbor that matches or nearly matches the third neighbor;
if the third neighbor matches the fourth neighbor, then storing data that identifies the third neighbor as a common neighbor of the first node and the second node;
based on the third neighbor, dividing the first subset into a first particular subset and a second particular subset, wherein the first particular subset indicates one or more fifth neighbors whose values are less than a value of the third neighbor, wherein the second particular subset indicates one or more sixth neighbors whose values are greater than the value of the third neighbor;
based on the fourth neighbor, dividing the second subset into a third particular subset and a fourth particular subset, wherein the third particular subset indicates one or more seventh neighbors whose values are less than a value of the fourth neighbor, wherein the fourth particular subset indicates one or more eighth neighbors whose values are greater than the value of the fourth neighbor;
wherein the method is performed by one or more computing devices.

2. The method of claim 1, wherein identifying the second neighbor comprises performing a binary search of the second set of neighbors.

3. The method of claim 1, further comprising:
after determining that the first neighbor matches the second neighbor, removing one or more neighbors from the first set of neighbors.

4. The method of claim 3, further comprising:
determining whether the second neighbor is the first neighbor or the last neighbor in the second set of neighbors;
wherein removing the one or more neighbors is based on determining that the second neighbor is the first neighbor or the last neighbor in the second set of neighbors.

5. The method of claim 1, further comprising:
determining whether the second subset and the fourth subset contain a common neighbor by performing a linear search of the second subset and the fourth sub set.

6. The method of claim 5, further comprising:
determining whether to perform the linear search based on a number of neighbors in the second subset or a number of neighbors in the fourth subset.

7. The method of claim 1, further comprising:
determining a first number that indicates a number of nodes in the first set of neighbors;
determining a second number that indicates a number of nodes in the second set of neighbors;
determining that the first number is greater than the second number;
identifying the first neighbor only in response to determining that the first number is greater than a particular size threshold.

8. The method of claim 1, further comprising:
determining a first number that indicates a number of nodes in the first set of neighbors;
determining a second number that indicates a number of nodes in the second set of neighbors;
determining that the first number is greater than the second number;
identifying the first neighbor only in response to determining that the first number is greater than a product of the second number and a third number that is independent of the first number and the second number.

9. A method for finding common neighbors of a first node and a second node in a graph that comprises a plurality of nodes that includes the first node and the second node, the method comprising:
identifying a first set of neighbors for the first node;
identifying a second set of neighbors for the second node;
determining a range value for the second set of neighbors;
generating, based on the range value, a data structure that is separate from the second set of neighbors for the second node and that comprises a plurality of entries, each of which corresponds a different subset of neighbors in the second set of neighbors;
for each entry in the plurality of entries, causing said each entry to reference a neighbor in the subset of neighbors that correspond to said each entry;
for a first neighbor in the first set of neighbors:
identifying, in the plurality of entries, a first entry that corresponds to the first neighbor,
using the first entry to identify one or more neighbors in a first subset of neighbors that correspond to the first entry and that are in the second set of neighbors;
wherein the method is performed by one or more computing devices.

10. The method of claim 9, further comprising:
for each other neighbor in the first set of neighbors:
identifying, in the plurality of entries, a particular entry that corresponds to said each other neighbor,
using the particular entry to identify one or more neighbors in a subset of neighbors that correspond to the particular entry.

11. The method of claim 9, further comprising:
performing a binary search of the first subset of neighbors to determine whether the first subset of neighbors includes a neighbor that matches the first neighbor.

12. The method of claim 9, further comprising:
   determining whether to generate the data structure for one of the first set of neighbors or the second set of neighbors;
   determining to generate the data structure that comprises the plurality of entries based on a number of neighbors in the second set of neighbors, wherein the number of neighbors in the second set of neighbors is greater than a number of neighbors in the first set of neighbors.

13. A method for optimizing code at compile time to efficiently identify common neighbors given two neighbor lists as input, the method comprising:
   making a first determination that a set of instructions, within the code, satisfies a first pattern that involves iterating through neighbors of a particular node in a graph that comprises a plurality of nodes that includes the particular node;
   making a second determination that the particular node is defined, within the code, as a neighbor of a second node;
   based on the first determination and the second determination and prior to executing the code, modifying the set of instructions, wherein modifying comprises replacing a least a portion of the set of instructions with a reference to a common neighbor function;
   reconstructing a Boolean expression in the set of instructions into multiple sub expressions;
   wherein modifying the set of instructions comprises removing a strict subset of the multiple sub expressions, wherein the set of instructions after removing does not include the strict subset of the multiple sub expressions;
   wherein the method is performed by one or more computing devices.

14. The method of claim 13, wherein modifying the set of instructions comprises removing a Boolean expression from the set of instructions.

15. One or more non-transitory computer-readable media carrying instructions for finding common neighbors of a first node and a second node in a graph that comprises a plurality of nodes that includes the first node and the second node, wherein the instructions, when executed by one or more processors, cause:
   identifying a first set of neighbors for the first node;
   identifying a second set of neighbors for the second node;
   identifying a first neighbor in the first set of neighbors;
   based on the first neighbor, identifying, in the second set of neighbors, a second neighbor that matches or nearly matches the first neighbor;
   if the first neighbor matches the second neighbor, then storing data that identifies the first neighbor as a common neighbor of the first node and the second node;
   based on the first neighbor, dividing the first set of neighbors into a first subset and a second subset, wherein the first subset indicates one or more first neighbors whose values are less than a value of the first neighbor, wherein the second subset indicates one or more second neighbors whose values are greater than the value of the first neighbor;
   based on the second neighbor, dividing the second set of neighbors into a third subset and a fourth subset, wherein the third subset indicates one or more third neighbors whose values are less than a value of the second neighbor, wherein the fourth subset indicates one or more fourth neighbors whose values are greater than the value of the second neighbor;
   identifying the first subset and the third subset;
   identifying a third neighbor in the first subset;
   based on the third neighbor, identifying, in the third subset, a fourth neighbor that matches or nearly matches the third neighbor;
   if the third neighbor matches the fourth neighbor, then storing data that identifies the third neighbor as a common neighbor of the first node and the second node;
   based on the third neighbor, dividing the first subset into a first particular subset and a second particular subset, wherein the first particular subset indicates one or more fifth neighbors whose values are less than a value of the third neighbor, wherein the second particular subset indicates one or more sixth neighbors whose values are greater than the value of the third neighbor;
   based on the fourth neighbor, dividing the second subset into a third particular subset and a fourth particular subset, wherein the third particular subset indicates one or more seventh neighbors whose values are less than a value of the fourth neighbor, wherein the fourth particular subset indicates one or more eighth neighbors whose values are greater than the value of the fourth neighbor.

16. The one or more non-transitory computer-readable media of claim 15, wherein identifying the second neighbor comprises performing a binary search of the second set of neighbors.

17. The one or more non-transitory computer-readable media of claim 15, wherein the instructions, when executed by the one or more processors, further cause:
   after determining that the first neighbor matches the second neighbor, removing one or more neighbors from the first set of neighbors.

18. The one or more non-transitory computer-readable media of claim 15, wherein the instructions, when executed by the one or more processors, further cause:
   determining whether the second subset and the fourth subset contain a common neighbor by performing a linear search of the second subset and the fourth sub set.

19. One or more non-transitory computer-readable media carrying instructions for finding common neighbors of a first node and a second node in a graph that comprises a plurality of nodes that includes the first node and the second node, wherein the instructions, when executed by one or more processors, cause:
   identifying a first set of neighbors for the first node;
   identifying a second set of neighbors for the second node;
   determining a range value for the second set of neighbors;
   generating, based on the range value, a data structure that is separate from the second set of neighbors for the second node and that comprises a plurality of entries, each of which corresponds a different subset of neighbors in the second set of neighbors;
   for each entry in the plurality of entries, causing said each entry to reference a neighbor in the subset of neighbors that correspond to said each entry;
   for a first neighbor in the first set of neighbors:
      identifying, in the plurality of entries, a first entry that corresponds to the first neighbor,
      using the first entry to identify one or more neighbors in a first subset of neighbors that correspond to the first entry and that are in the second set of neighbors.

20. The one or more non-transitory computer-readable media of claim 19, wherein the instructions, when executed by the one or more processors, further cause:

for each other neighbor in the first set of neighbors:
  identifying, in the plurality of entries, a particular entry that corresponds to said each other neighbor,
  using the particular entry to identify one or more neighbors in a subset of neighbors that correspond to the particular entry.

21. The one or more non-transitory computer-readable media of claim 19, wherein the instructions, when executed by the one or more processors, further cause:
  determining whether to generate the data structure for one of the first set of neighbors or the second set of neighbors;
  determining to generate the data structure that comprises the plurality of entries based on a number of neighbors in the second set of neighbors, wherein the number of neighbors in the second set of neighbors is greater than a number of nodes in the first set of neighbors.

22. A system for finding common neighbors of a first node and a second node in a graph that comprises a plurality of nodes that includes the first node and the second node, the system comprising:
  one or more processors;
  one or more computer-readable storage media carrying instructions which, when executed by one or more processors, cause:
    identifying a first set of neighbors for the first node;
    identifying a second set of neighbors for the second node;
    identifying a first neighbor in the first set of neighbors;
    based on the first neighbor, identifying, in the second set of neighbors, a second neighbor that matches or nearly matches the first neighbor;
    if the first neighbor matches the second neighbor, then storing data that identifies the first neighbor as a common neighbor of the first node and the second node;
    based on the first neighbor, dividing the first set of neighbors into a first subset and a second subset, wherein the first subset indicates one or more first neighbors whose values are less than a value of the first neighbor, wherein the second subset indicates one or more second neighbors whose values are greater than the value of the first neighbor;
    based on the second neighbor, dividing the second set of neighbors into a third subset and a fourth subset, wherein the third subset indicates one or more third neighbors whose values are less than a value of the second neighbor, wherein the fourth subset indicates one or more fourth neighbors whose values are greater than the value of the second neighbor;
    identifying the first subset and the third subset;
    identifying a third neighbor in the first subset;
    based on the third neighbor, identifying, in the third subset, a fourth neighbor that matches or nearly matches the third neighbor;
    if the third neighbor matches the fourth neighbor, then storing data that identifies the third neighbor as a common neighbor of the first node and the second node;
    based on the third neighbor, dividing the first subset into a first particular subset and a second particular subset, wherein the first particular subset indicates one or more fifth neighbors whose values are less than a value of the third neighbor, wherein the second particular subset indicates one or more sixth neighbors whose values are greater than the value of the third neighbor;
    based on the fourth neighbor, dividing the second subset into a third particular subset and a fourth particular subset, wherein the third particular subset indicates one or more seventh neighbors whose values are less than a value of the fourth neighbor, wherein the fourth particular subset indicates one or more eighth neighbors whose values are greater than the value of the fourth neighbor.

* * * * *

UNITED STATES PATENT AND TRADEMARK OFFICE
CERTIFICATE OF CORRECTION

PATENT NO. : 10,157,239 B2
APPLICATION NO. : 14/139237
DATED : December 18, 2018
INVENTOR(S) : Hong et al.

Page 1 of 1

It is certified that error appears in the above-identified patent and that said Letters Patent is hereby corrected as shown below:

In the Specification

In Column 8, Line 12, delete "([Nvl)," and insert -- ([Nvl), --, therefor.

In Column 10, Line 43, delete "that that" and insert -- that --, therefor.

In Column 12, Line 54, delete "list" and insert -- list. --, therefor.

In the Claims

In Column 19, Line 24, in Claim 13, delete "a least" and insert -- at least --, therefor.

Signed and Sealed this
Seventh Day of January, 2020

Andrei Iancu
*Director of the United States Patent and Trademark Office*